United States Patent [19]

Kaise

[11] Patent Number: 4,609,273

[45] Date of Patent: Sep. 2, 1986

[54] IRIS DIAPHRAGM DEVICE FOR A CAMERA

[75] Inventor: Hitoshi Kaise, Nirasaki, Japan

[73] Assignee: Nippon Seimitsu Kogyo Kabushiki Kaisha, Kofu, Japan

[21] Appl. No.: 753,787

[22] Filed: Jul. 11, 1985

[51] Int. Cl.$^4$ .............................................. G03B 9/02
[52] U.S. Cl. ................................................. 354/271.1
[58] Field of Search ................................ 354/449–453, 354/234.1, 270, 271.1, 274; 352/141; 358/228

[56] References Cited

U.S. PATENT DOCUMENTS 3,461,786 8/1969 Sato et al. ................... 352/141 X

FOREIGN PATENT DOCUMENTS 205340 9/1959 Fed. Rep. of Germany ...... 354/271
51729 5/1981 Japan ................................. 354/271

Primary Examiner—William B. Perkey
Attorney, Agent, or Firm—Oblon, Fisher, Spivak, McClelland & Maier

[57] ABSTRACT

An iris diaphragm device wherein a rocking motion of a movable magnetic member caused by application of a driving electric current corresponding to the brightness of a subject is transmitted to a leaf operating member for opening or closing iris diaphragm leaves through a connecting lever provided at the both end portions thereof with clearances. Because of the clearances, the iris diaphragm leaves open or close in prompt response to the application of the driving electric current and a chattering motion of the movable magnetic member brought about when it stops is completely absorbed, thereby enable a non-flickering exposure.

14 Claims, 11 Drawing Figures

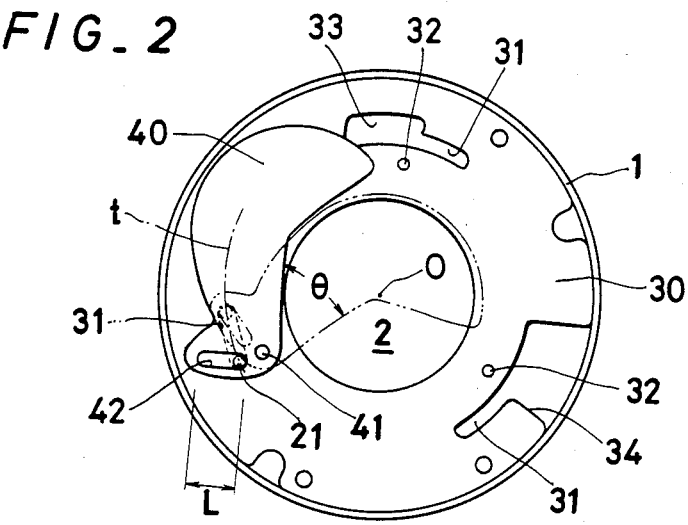
FIG_2
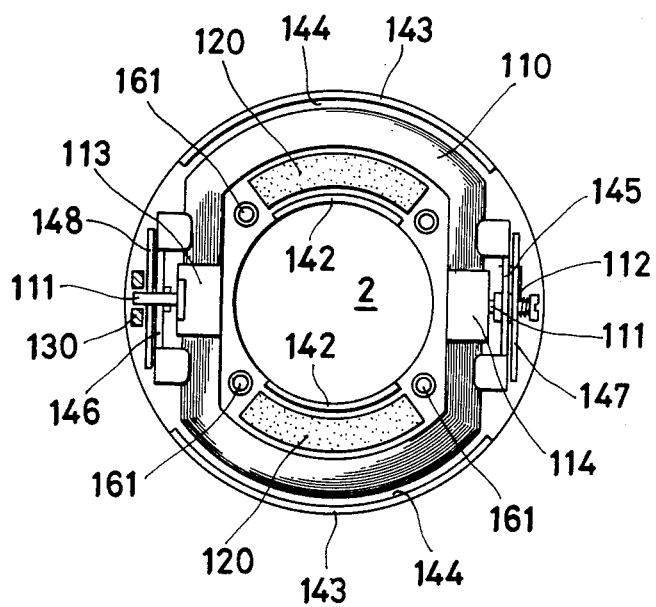
FIG_3

IRIS DIAPHRAGM DEVICE FOR A CAMERA

BCKGROUND OF THE INVENTION

1. Field of the Invention

This invention relates to an iris diaphragm device applicable to an automatic exposure control system in cameras of various types and, more particularly, to an iris diaphragm device which enables iris diaphragm leaves to stably open or close without a chattering motion so as to form an iris aperture of suitable size according to the brightness of a subject, whereby a non-flicker exposure is effected.

2. Description of the Prior Art

An iris diaphragm device for use in a video camera, a cinecamera or the like generally comprises an iris diaphragm element having a plurality of iris diaphragm leaves for forming an iris aperture, and a drive means having a construction similar to that of an electric motor which is composed of a movable magnetic member and a stationary magnetic member and adapted to open or close the iris diaphragm leaves so as to determine appropriate exposure according to the brightness of a subject detected by means of a photoelectric device such as a charge coupled device (CCD). In general, the iris diaphragm device of this type is incorporated in a lens barrel or a camera body.

Various diaphragm devices having such a construction as mentioned above have been proposed. For example, the conventional diaphragm device disclosed in Japanese Patent Application Public Disclosure No. Sho 58(1983)-80627 is designed to generate relatively large rotational torque even from a feeble electric current corresponding to the brightness of a subject so as to reliably open or close the iris diaphragm leaves. This prior art device comprises a moving coil as a movable magnetic member disposed concentrically relative to magnets as a stationary magnetic member circularly arranged around the optical axis and rotatably supported by pivot members protruding outwardly from both sides thereof in the direction perpendicular to the optical axis, and a leaf operating disc of a ring shape which is capable of angularly rotating around the optical axis by applying an electric current corresponding to the brightness of the subject to the moving coil, to thereby open or close the iris diaphragm leaves so as to form an iris aperture of suitable size. In this device, a connecting arm integrally fixed on one of side pivot portions of the moving coil is used as a means for transmitting a rocking motion of the moving coil to the leaf operating disc. That is to say, the connecting arm protruding from one of the opposed side pivot portions of the moving coil toward the leaf operating disc in the direction perpendicular to the pivot members of the moving coil is coupled at the free end thereof with the leaf operating disc, whereby the rocking motion of the moving coil is directly transmitted to the leaf operating disc so as to effect an opening or closing of the iris diaphragm leaves. The diaphragm device enjoys an advantage that the rocking motion of the moving coil can be reliably transmitted to the leaf operating disc with minimum loss in prompt response to application of a driving electric current thereto because there is no medium for transmission of motion therebetween except for the connecting arm integrally fixed on the moving coil. However, the moving coil cannot exactly stop at the magnetic equilibrium point determined by the intensity of the electric current applied to the moving coil due to the force of inertia. The moving coil thus overshooting the magnetic equilibrium point stops and then moves rearwardly by the energizing force of a spring which is generally provided in the device of this type and by counterelectromotive force generated by overshooting of the moving coil. Nevertheless, the moving coil which moves backward will again overshoot the magnetic equilibrium point just a little. Consequently, the moving coil is repeatedly rocked around the magnetic equilibrium point and gives rise to a chattering motion, and then stops at that point in time. As a result, the iris diaphragm leaves are unstably moved so as to cause a flickering phenomenon which brings about lowering of the optical characterisitcs of a camera. The same is true in the case where the movable magnetic member is a magnet and the stationary magnetic member is of one or more electromagnetic coils. Disadvantageously, if a damper means is used to prevent an overshooting motion of the movable magnetic member, the iris diaphragm leaves cannot effectively respond to a change in brightness of a subject. Instead, if an electrically controlling circuit for compensating the force of inertia brought about by the rocking motion of the moving coil is adopted, the device is complicated in structure and is expensive.

SUMMARY OF THE INVENTION

In view of the above, the object of the present invention is to provide an iris diaphragm device of a simple structure, in which the iris diaphragm leaves open or close reliably and stably in quick response to application of a driving electric current corresponding to the brightness of a subject, whereby an iris aperture of suitable size can promptly be formed with accuracy without causing a chattering motion and so as to enable a non-flickering exposure.

To attain the above object according to the present invention an iris diaphragm device is provided for use in a camera, which comprises one or more iris diaphragm leaves capable of opening or closing around the optical axis to form an iris aperture, a leaf operating member rotatably disposed around the optical axis to operate the iris diaphragm leaves to open or close, drive means having a movable magnetic member capable of moving rockingly around pivot members extending outward from opposed side portions of the movable magnetic member and one or more stationary magnetic members, and motion transmitting means composed of an arm member extending from one of side portions of the movable magnetic member and a connecting lever having one end thereof rotatably coupled with the free end portion of the arm member through a clearance and a second end thereof rotatably coupled with the leaf operating member through a clearance so as to transmit the rocking motion of the movable magnetic member to the leaf operating member.

Each of the coupling means between the connecting lever and the respective arm member and leaf operating member may consist of a crank pin and a guide slit, for example. In this case, the crank pin has a diameter smaller than the width of the guide slit to form a clearance. Preferably, the coupling means is designed to bring the crank pin into point contact with the inner edge of the guide slit so as to lessen the transmission loss of motion.

The movable magnetic member is driven so as to be rocked by supplying thereto a driving electric current corresponding to the quantity of the incident light into a lens system of the camera. The first transition movement of the movable magnetic member is accelerated due to the two clearances formed in the coupling means provided at the both end portions of the connecting lever, whereby the iris diaphragm leaves move with alacrity. Furthermore, a chattering motion of the movable magnetic member which is caused around the magnetic equilibrium point due to the force of inertia is completely absorbed by the aforementioned clearances and is no longer transmitted to the leaf operating member. Consequently, the iris diaphragm leaves promptly move following the brightness of the subject without causing a chattering motion even if the brightness is suddenly changed, to thereby enable a non-flickering exposure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic view for explaining the operating principle of an iris diaphragm leaf mounted in the diaphragm device of this invention;

FIG. 3 is a bottom view of a drive means of this invention;

DESCRIPTION OF THE PREFERRED EMBODIMENTS

Figure 1:
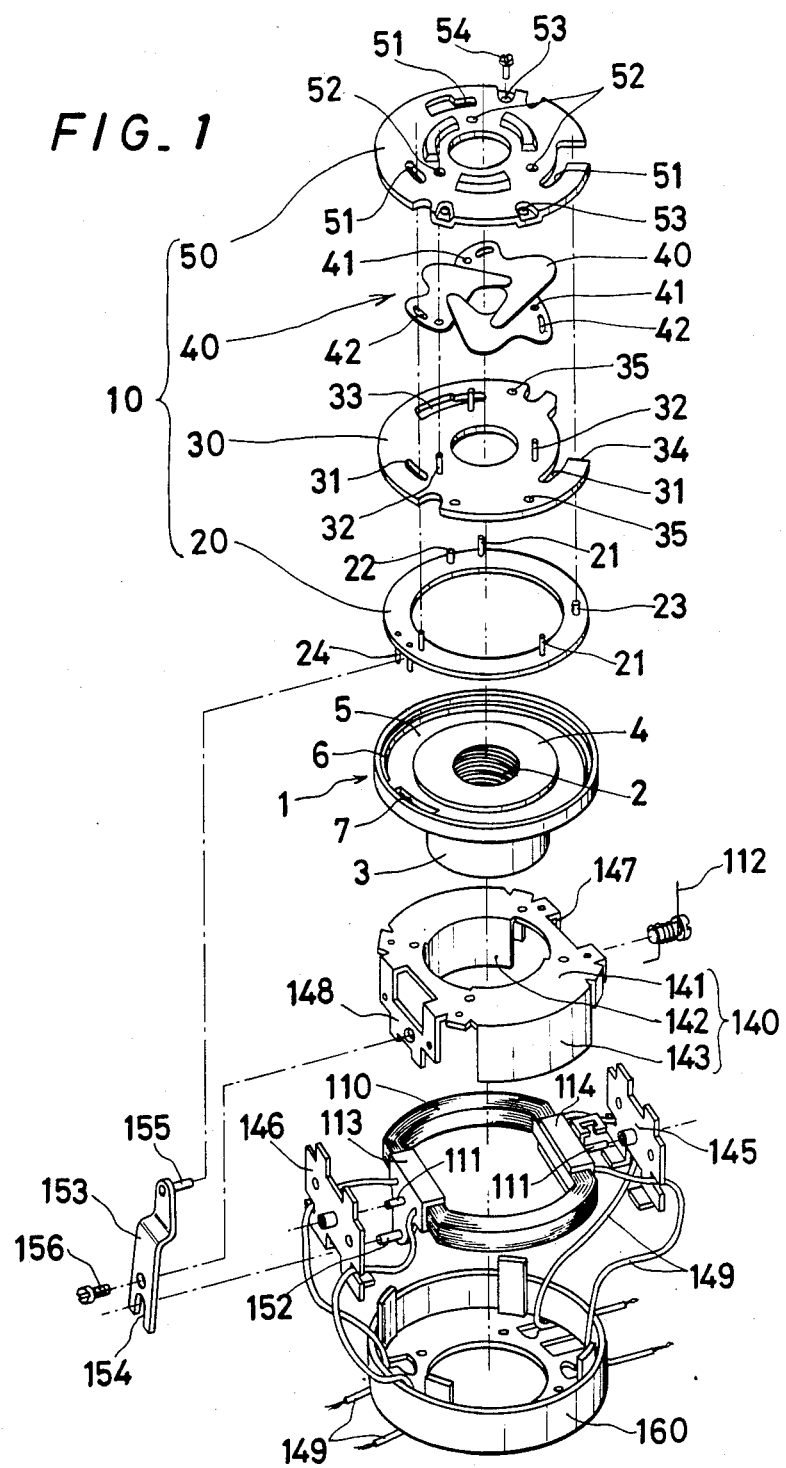
FIG. 1 is a schematical perspective view showing, in a disassembled manner, one embodiment of the iris diaphragm device according to this invention.
Figure 4:
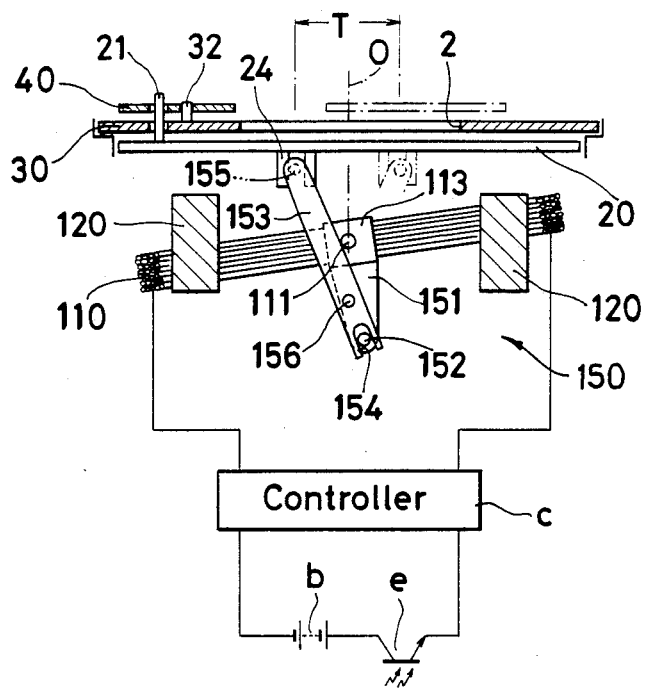
FIG. 4 is a schematic view for explaining the operating principle of the drive means in the diaphragm device of this invention.

This invention relates to an iris diaphragm device which comprises a base member 1, a diaphragm element 10 and a drive means 100 and is incorporated into a lens system in a video camera, a cinecamera or the like.

The base member 1 comprises a cylindrical body 3 having an aperture 2 with the center through which an optical axis O passes, and a flange portion 4 extending outwardly from the circumferential surface of one end of the cylindrical body 3. The flange portion 4 is provided in one side surface thereof with an annular groove 5 and an annular step portion 6. In a part of the flange portion 4, a through hole 7 is bored.

The diaphragm element 10 which is fixed on the base member 1 comprises a leaf operating member 20, a supporting plate 30, a set of iris diaphragm leaves 40, and a cover plate 50.

The leaf operating member 20 is rotatably set in the annular groove 5 formed in the flange portion 4 of the base member 1 and provided on one surface thereof with sliding pins 21 equal in number to the iris diaphragm leaves 40 and stopper pins 22 and 23, and on the other surface with a connector 24. In this embodiment, the connector 24 is composed of a pair of round rods.

The supporting plate 30 has an outer diameter substantially the same as that of the annular step portion 6 formed in the flange portion 4 of the base member 1 and arcuate slots 31 through which the sliding pins 21 on the leaf operating member 20 are slidably inserted so that the sliding pins 21 can move in the circumferential direction by a fixed length. On one side of the supporting plate 30, leaf supporting pins 32 for pivotally supporting the iris diaphragm leaves 40 are distributed substantially equidistantly about the periphery of the iris aperture. The supporting plate 30 is further provided with a slot 33 and a notch 34 for admitting the corresponding stopper pins 22 and 23 thereinto so as to restrict the rotation of the leaf operating member 20 within a limited range. These stopper pins 22 and 23, the slot 33 and the notch 34 are not indispensable components of the invention. That is to say, instead of these components, the restriction of the rotation of the leaf operating member 20 may be accomplished merely by means of the sliding pins 21 and the arcuate slots 31 which are engaged with each other. Further, if the leaf supporting pins 32 on the supporting plate 30 are provided on the base member 1 and the slots 31 and 33 and the notch 34 are formed in the cover plate 50, the supporting plate 30 can be omitted. Denoted by 35 are screw fitting holes.

In this embodiment, the iris diaphragm leaves 40 arranged in a circular form are adopted, whereas the shape and number of the iris diaphragm leaves are not specifically limited. For example, one or more leaves may be disposed at equal distances around the aperture and simultaneously, the sliding pins 21 on the leaf operating member 20 and the arcuate slots 31 and the leaf supporting pins 32 on the supporting plate 30 should be equal in number to the diaphragm leaves 40. Each of the iris diaphragm leaves 40 has a pivot hole 41 for receiving the corresponding leaf supporting pin 32 fixed on the supporting plate 30 and a cam slot 42 into which the corresponding sliding pin 21 fixed on the leaf operating member 20 is slidably admitted.

The relationship between the pivot hole 41, the cam slot 42 formed in the iris diaphragm leaf 40 and the leaf operating member 20 will be explained with reference to FIG. 2. The iris diaphragm leaf 40 is swung around the leaf supporting pin 32 within the range of the angle θ, that is, from the open state in which the iris diaphragm leaf 40 is completely opened out to form the entire aperture as illustrated by the full line in FIG. 2 to the close state in which the iris diaphragm leaf 40 is closed to cause the aperture to disappear as illustrated by the chain line in FIG. 2. The required range within which the diaphragm leaf should be swung and the required length L of the cam slot 42 cannot be specified because they depend on the inclination of the cam slot 42 relative to the pivot hole 41, for example. Although the orbit t along which the sliding pins on the leaf operating member 20 rotatably move is placed outside the pivot holes 41 in the illustrated embodiment, the orbit may nevertheless be located inside the pivot hole 41.

The cover plate 50 is adapted to cover the leaf operating member 20, the supporting plate 30, and the iris diaphragm leaves 40 which are contained within the annular groove 5 in the base member 1 and is provided with guide recesses 51 for guiding the aforementioned sliding pins 21 and bearing holes 52 for pivotally supporting the leaf supporting pins 32. The cover plate 50 is attached to the base member 1 by use of screw means 54 to be inserted through fitting portions 53.

In this embodiment, the drive element 100 comprises a movable magnetic member 110 formed in a noncircular shape having its center which is substantially in agreement with the optical axis O and a pair of stationary magnetic members 120 disposed inside the movable magnetic member 110 and opposed to each other across the aperture as shown in FIG. 3. The movable magnetic member 110 is an electromagnetic coil which is excited by supplying an electric current thereto and the stationary magnetic members 120 are arcuate permanet magnets. In general, the electromagnetic coil for use in the diaphragm device of this type has a double coil structure composed of a coil for generating rotational moment and a damping coil.

In the drive means 100, a yoke 140 adapted to support the movable magnetic member 110 and the stationary magnetic member 120 comprise a base plate 141 having an aperture and arcuate inner and outer walls 142 and 143 extend vertically relative to the base plate 141 from the inner and outer edge portions of the base plate 141. The stationary magnetic members 120 are held in position within the space 10 defined between the opposed inner and outer walls 142 and 143 in a state of intimate contact with either the inner walls or the outer walls. The movable magnetic member 110 is pivotally supported between the respective stationary magnetic members 120 and either the outer walls 143 or the inner walls 142 which are separated from the stationary magnetic members. Though the movable magnetic member 110 in this embodiment assumes a substantially elliptical shape, it may be formed in a circular or polygonal shape. Though the movable magnetic member 110 is kept energized by a spring 112 in one direction so as to close the iris diaphragm leaves 40 when the camera is out of use, the spring 112 is not an indispensable component for the diaphragm device of the invention. To the opposed side portions of the movable magnetic member 110, there are respectively attached pivot fixing seats 113 and 114 each having the pivot pin 111 extending outwardly therefrom. The pivot pins 111 formed integrally on the respective pivot fixing seats are pivotally supported by supporting frames 147 and 148 of the yoke 140 by the means of bearing members 145 and 146. Through lead wires 149 a driving electric current corresponding to the brightness of the subject is supplied to the movable magnetic member 110. The movable magnetic member 110 is excited by application of the electric current and then angularly rotated around the pivot pins 111 by the electromagnetic interaction between the movable magnetic member which is a moving coil and the stationary magnetic member 120 which is composed of magnets in this embodiment.

The rocking motion of the movable magnetic member 110 is transmitted to the aforementioned leaf operating member 20 by means of a motion transmitting means 150. The motion transmitting means 150 comprises an arm member 151 fixed on the pivot fixing seat 113 of the movable magnetic member 110 and provided at its free end portion with a crank pin 152, and a connecting lever 153 provided at one end portion thereof with a guide slit 154 for slidably receiving the crank pin 152 of the arm member 151 to constitute a first coupling means and at the other end portion thereof with a crank pin 155 which is coupled with the connector 24 disposed on the lower surface of the leaf operating member 20 to constitute a second coupling means. The connecting lever 153 is rotatably supported by a support pin 156 which is eccentrically disposed relative to the pivot 111 extending from the movable magnetic member 110. The eccentricity of the pivot 111 relative to the support pin 156 and the lever ratio of the connecting lever 153 depend on the required amount of angular rotation of the leaf operating member 20 for opening or closing the iris diaphragm leaves 40 in order to determine the optimum aperture. Preferably, the length from the support pin 156 to the guide slit 154 is made shorter than that from the support pin 156 to the crank pin 155 to thereby gain larger momentum. If the aforementioned lever ratio is changed, the amount of rotation T, of the leaf operating member 20 can be suitably determined.

The diameter of the crank pin 152 provided on the free end portion of the arm member 151 is made smaller than the width of guide slit 154 so as to form a clearance. Similarly, the the crank pin 155 provided on one end portion of the connecting lever 153 is made smaller than the gap between the opposed rods constituting the connector 24 in this embodiment to form a clearance.

Denoted by 160 is a cover which is attached to the yoke 140 by the medium of spacers 161 to define a space for accommodating the movable magnetic member 110 and the stationary magnetic member 120.

The operation of the embodiment described above will be explained hereinbelow.

The movable magnetic member 110 which is an electromagnetic coil is applied with a fixed bias current while in use. The electric current to be supplied from a power source b to the movable magnetic member 110 is varied in quantity or changed in its polarity to reverse the direction of the magnetization thereof by means of a controller c in accordance with the quantity of the light incident upon an photoelectric element e. This diaphragm device can utilize any of conventional controlling circuits as a controller for controlling the electric current to be applied to the movable magnetic member. Thus, the movable magnetic member 110 is swingingly moved. The swinging motion of the movable magnetic member 110 is transmitted to the leaf operating member 20 through the medium of the connecting lever 130 and the connector 24 attached to the leaf operating member 20 to thereby cause opening or closing motion of the iris diaphragm leaves 40 so as to determine the appropriate exposure.

The operation of the motion transmitting means in the initial state will be described below with reference to FIG. 5(A).

Figure 5A:
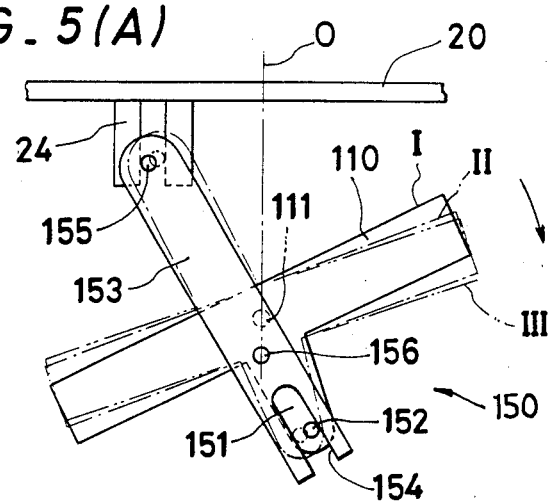
FIGS. 5(A) and 5(B) are schematic views for explaining the operating principle of a motion transmitting means in one embodiment of this invention.

The movable magnetic member 110 rests at the initial position I illustrated by the solid line in FIG. 5(A) due to the energizing force of the spring 112. The movable magnetic member 110 when applied with a driving electric current generates rotational torque in the clockwise direction in the illustrated embodiment so as to begin to move. However, the rotational motion of the movable magnetic member 110 is not transmitted to the connecting lever 153 because of the clearance in the first coupling means constructed by the crank pin 152 and the guide slit 154 formed in the connecting lever 153. At this time, because the movable magnetic member 110 moves under no load, the rotational motion thereof is accelerated. Therefore, when the movable magnetic member 110 reaches the position II, the crank pin 152 provided on the arm member 151 contacts with one side edge of the guide slit 154 at high speed. Because the load applied on the movable magnetic member 110 by bringing the crank pin 152 into collision with the side edge of the guide slit is slight, the connecting lever 153 is swung to bring the crank pin 155 into contact with the connector 24 at high speed to move the leaf operating member 20 when the movable magnetic member 110 reaches the position III. Thus, the movable magnetic member 110 can be moved with sufficient acceleration due to the clearances formed in the first and second coupling means at the opposed end portions of the connecting lever 153 and offers an ample driving force for operating the leaf operating member 20 and the iris diaphragm leaves 40 with alacrity in opposition to the static load of the leaf operating member 20.

Figure 5B:
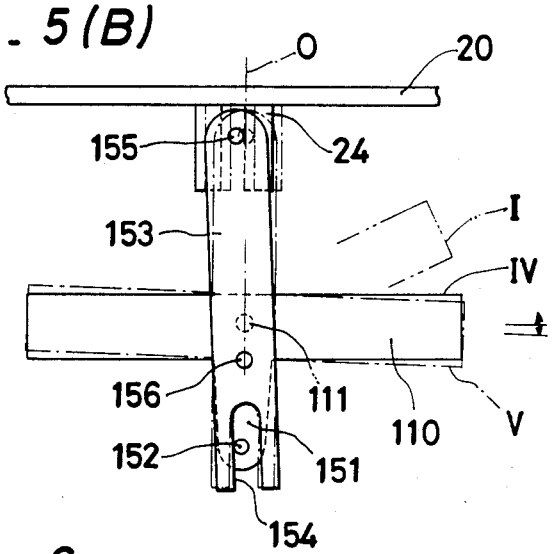

The movable magnetic member 110 which has moved at high speed by the application of the driving electric current corresponding to the brightness of the subject does not stop at the magnetic equilibrium point IV which is determined by the intensity of the driving electric current to be applied thereto due to the force of inertia and somewhat overshoots point IV to the point V as shown in FIG. 5(B). However, the movable magnetic member 110 thus overshooting turns back from the point IV due to counterelectromotive force generated by the overshooting of the movable magnetic member 110 and then again overshoots the magnetic equilibrium point. As a result, the movable magnetic member 110 is repeatedly rocked around the magnetic equilibrium point V as it vibrates as shown by the bidirectional arrow in FIG. 5(B) and then stops at the magnetic equilibrium point in time. However, according to this invention, the rocking movement of the movable magnetic member 110 is completely absorbed by the clearances formed in the coupling mechanisms at the both end portions of the connecting lever 135 and therefore, can no longer be transmitted to the leaf operating member 20, thereby completely preventing a chattering motion of the iris diaphragm leaves 40.

Figure 6:
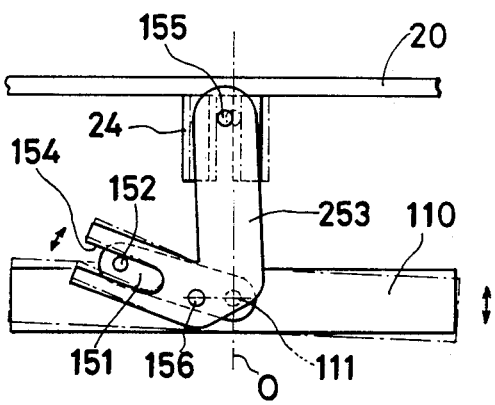
FIG. 6 is a schematic view of a motion transmitting means in another embodiment of this invention.

Though the connecting lever 153 is made straight in the foregoing embodiment, a hook-shaped lever 253 rotatably supported by a support pin 156 as shown in FIG. 6 may be used instead of the connecting lever 153. In the embodiment shown in FIG. 6, those elements denoted by the same reference numerals as those in the foregoing embodiment are equivalent in function to those in the former embodiment. The construction in this embodiment provides an advantage in that a space factor of the motion transmitting means relative to a cover 160 in which the drive means 100 is incorporated is somewhat improved.

Figure 7A:
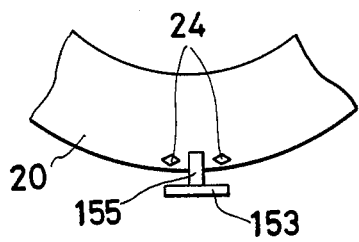
FIGS. 7(A) to 7(D) are schematic explanatory views showing, in part, of various coupling means in the iris diaphragm device according to this invention.
Figure 7B:
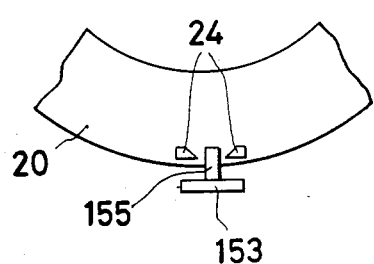
Figure 7C:
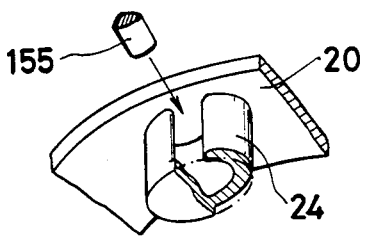
Figure 7D:
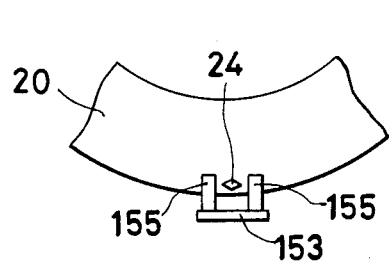

There is a possiblility that the loss caused in transmitting the rocking motion of the movable magnetic member 110 to the leaf operating member 20 is increased when the crank pin 155 fixed on the connecting lever 153 assumes a great angle relative to the connector 24 mounted on the leaf operating member 20. To lessen the transmission loss thus caused, it is appropriate to decrease the area of contact between the crank pin 155 and the connector 24. Accordingly, the pair of round rods constituting the connector 24 in the foregoing embodiment may assume a polygonal shape in cross section. For example, each cross section of rods constituting the connector 24 may be formed in a diamond shape as shown in FIG. 7(A) or a triangle shape, or a wedge shape as shown in FIG. 7(B). Otherwise, the connector 24 may have a C-shaped cross section as shown in FIG. 7(C), to thereby improve the intensity of thereof and hold the crank pin 155 in position. Conversely, the crank pin 155 on the connecting lever 153 may be constituted by a pair of pin rods and the connector 24 may formed of one pin which is put between the pin rods of the connecting lever 153 as shown in FIG. 7(D).

Further, the aforementioned embodiments are explained using an electromagnetic coil as a movable magnetic member 110 and one or more permanent magnets as a stationary magnetic member 120. Nevertheless, it would be obvious that the movable magnetic member 110 may be made of a permanent magnet ring and the stationary magnetic member 120 may be formed of one or more electromagnetic coils from a standpoint of reversibility of an electromagnetic circuit system of this type. Also, though the drive means in these embodiments adopts at least one permanent magnet, it goes without saying that an electromagnet can obviously substitute for a permanent magnet. Furthermore, there may be adopted a construction in which a pivot hole is bored in the respective pivot seats 113 and a pivot pin is provided on the respective bearing members 145 and 146 instead of the pivot structure having the pivots 111 extending from the pivot seats 113 as in the illustrated embodiment.

As is evident from the foregoing description, the iris diaphragm device according to this invention is simple in structure, and is reliable and stable in opening or closing operation of the iris diaphragm leaves without entailing a chattering motion even when the brightness of a subject is suddenly changed, whereby a non-flickering exposure can be effected.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An iris diaphragm device for use in a camera, which comprises one or more iris diaphragm leaves capable of opening or closing around the optical axis to form an iris aperture; a leaf operating member disposed rotatably around the optical axis to open or close said iris diaphragm leaves; drive means having a movable magnetic member capable of moving rockingly around pivots extending outward from the opposed side portions of said movable magnetic member and one or more stationary magnetic members arranged along said movable magnetic member; and motion transmitting means composed of an arm member extending from of said side portions of said movable magnetic member and a connecting lever having its one end rotatably coupled with the free end portion of said arm member through a clearance to constitute a first coupling mechanism and the other end rotatably coupled with said leaf operating member through a clearance to constitute a second coupling mechanism so as to transmit the rocking motion of said movable magnetic member to said leaf operating member, said connecting lever being pivotally supported by a support pin eccentrically disposed relative to said pivots of the movable magnetic member, the length from said support pin to said first coupling mechanism being made shorter than that from said support pin to said second coupling mechanism.

2. An iris diaphragm device according to claim 1, wherein the first coupling mechanism further comprises a crank pin fixed on said arm member and a guide slit formed in one end portion of said connecting lever, and the second coupling mechanism further comprises a crank pin fixed on the other end portion of said connecting lever and a connector fixed on said leaf operating member.

3. An iris diaphragm device according to claim 2, wherein said connecting lever is of a straight shape.

4. An iris diaphragm device according to claim 2, wherein said connecting lever is of a hoop shape.

5. An iris diaphragm device according to claim 2, wherein said connector further comprises a pair of round rods.

6. An iris diaphragm device according to claim 2, wherein said connector further comprises a pair of rods each having a polygonal cross section.

7. An iris diaphragm device according to claim 2, wherein said connector is of a C-shaped cross section.

8. An iris diaphragm device for use in a camera, comprising:
   a base member;
   a support plate;
   one or more iris diaphragm leaves pivotably supported by respective leaf supporting pins disposed fixedly relative to said supporting plate for opening or closing of said leaves around an optical axis to form an iris aperture;
   a leaf operating member disposed on said base member so as to rotate around the optical axis for opening or closing of said iris diaphragm leaves and which further comprises a connector interconnected with said base member;
   drive means having a movable magnetic member provided with pivot means extending outward from opposed side portions thereof and one or more stationary magnetic members arranged along said movable magnetic member, said movable magnetic member being angularly rotated by an electromagnetic interaction between said movable magnetic member and said stationary magnetic member; and
   motion transmitting means which further comprises an arm member extending from one of said opposed side portions of said movable magnetic member and a connecting lever pivotably supported by a supporting pin eccentrically disposed relative to said pivot means of said movable magnetic member, first coupling means for rotatably coupling a first end of said connecting lever to a free end portion of said arm member with a clearance formed therebetween, and second coupling means for rotatably coupling a second end of said connecting lever to said connector of said leaf operating member with a clearance therebetween so as to transmit angular motion of said movable magnetic member to said leaf operating member, the length from said support pin to said first coupling means being shorter than that from said support pin to said second coupling means.

9. An iris diaphragm device according to claim 8, wherein said first coupling means further comprises a first crank pin fixed on said arm member and a guide slit formed in a first end portion of said connecting lever and adapted to rotatably receive said first crank pin, and wherein said second coupling means further comprises a second crank pin fixed on a second end portion of said connecting lever, said connector being mounted on said leaf operating member to rotatably receive said second crank pin.

10. An iris diaphragm device according to claim 9, wherein said connecting lever is of a straight shape.

11. An iris diaphragm device according to claim 9, wherein said connecting lever is of a hook shape.

12. An iris diaphragm device according to claim 8, wherein said connector further comprises a pair of round rods.

13. An iris diaphragm device according to claim 8, wherein said connector further comprises a pair of rods each having a polygonal cross section.

14. An iris diaphragm device according to claim 8, wherein said connector is of a C-shaped cross section.

* * * * *